United States Patent [19]
Leff

[11] 3,878,623
[45] Apr. 22, 1975

[54] DEVICE FOR TEACHING THE OPERATION OF A TELEPHONE

[76] Inventor: Ruth B. Leff, 3279 N. Sherman Blvd., Milwaukee, Wis. 53216

[22] Filed: Aug. 2, 1973

[21] Appl. No.: 384,970

Related U.S. Application Data

[63] Continuation of Ser. No. 258,650, June 1, 1972, abandoned.

[52] U.S. Cl................................. 35/8 R; 35/75
[51] Int. Cl. ................................... G09b 19/00
[58] Field of Search............ 35/1, 8 R, 10, 13, 31 E, 35/75; 40/336, 337, 338, 339, 341, 352; 179/90 AN, 90 FW, 90 D, 90 K

[56] References Cited
UNITED STATES PATENTS

| | | | |
|---|---|---|---|
| 381,425 | 4/1888 | Rosenwasser et al. | 35/9 E UX |
| 1,666,337 | 4/1928 | McDade | 35/9 E |
| 1,896,352 | 2/1933 | Fiveash | 40/337 |
| 2,808,668 | 10/1957 | Christin | 40/337 |
| 2,871,816 | 2/1959 | McConnell | 40/352 X |
| 3,073,909 | 1/1963 | Tilden | 179/90 AN |

*Primary Examiner*—Wm. H. Grieb
*Attorney, Agent, or Firm*—Andrus, Sceales, Starke & Sawall

[57] ABSTRACT

A device for teaching the operation of a telephone. The ten operating numbers on a telephone, corresponding to the finger holes in the dialing ring of a dial telephone or the buttons in a push-button telephone, are provided with different visual markings, such as different colors, or different figures, so that each marking corresponds to one of the ten numbers. The markings corresponding to a specific telephone number to be dialed are applied in sequence to a card or strip and the markings on the card are individually viewed through a window in a card holder. As each marking is viewed, the student will actuate the corresponding marking on the telephone to place the call.

8 Claims, 5 Drawing Figures

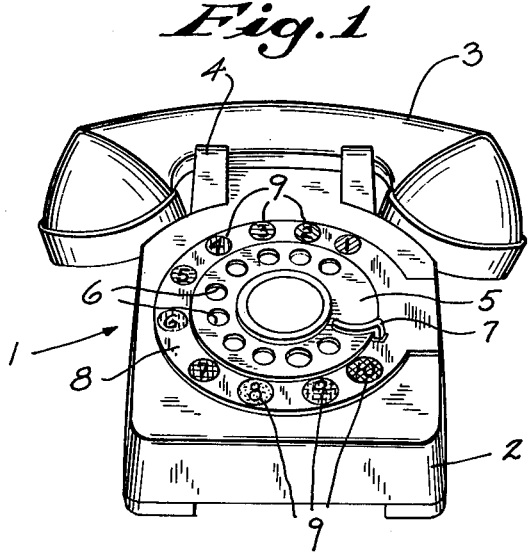
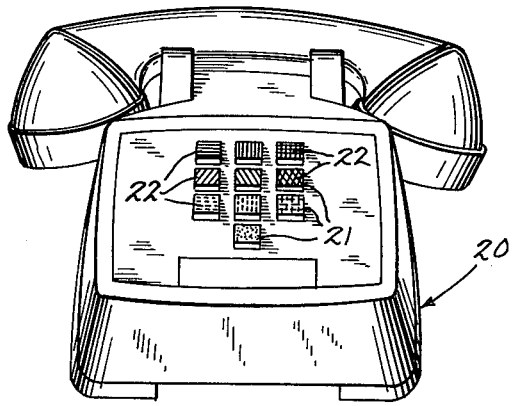
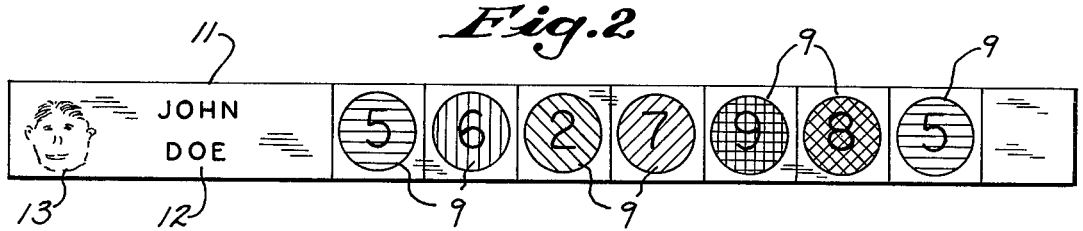
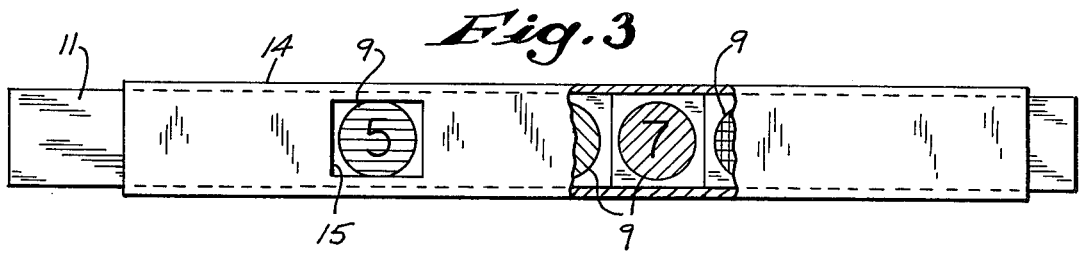
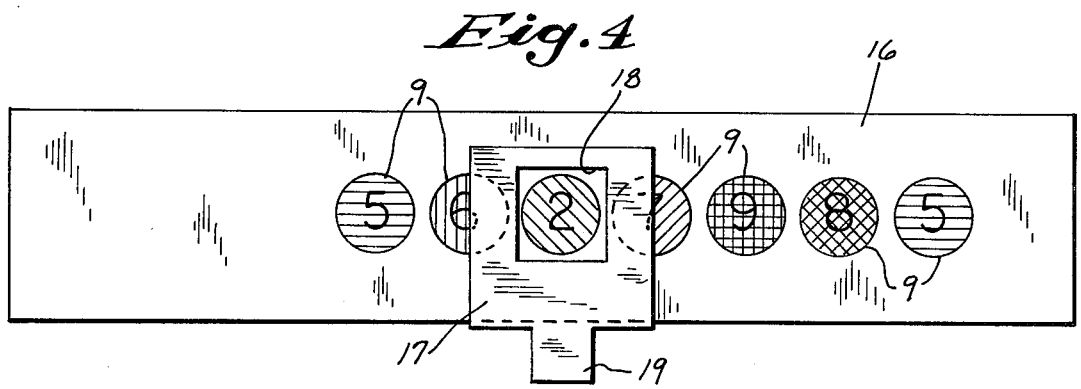

3,878,623

DEVICE FOR TEACHING THE OPERATION OF A TELEPHONE

This is a continuation of application Ser. No. 258,650, filed June 1, 1972, and now abandoned.

BACKGROUND OF THE INVENTION

Mentally retarded, or physically infirmed persons, as well as young children, are frequently unable to properly dial a telephone number or properly actuate the buttons of a push-button type telephone. For example, many illiterate people being unable to read numbers cannot make a call. Mentally retarded persons, such as so-called "trainables" who are capable of being trained in certain skills, may have great difficulty in dialing a telephone number either due to visual problems, or due to the inability to satisfactorily distinguish individual numerals or due to difficulty in separating and analyzing a string of numerals. Even so-called "educables", who have a higher I.Q. than trainables, usually have difficulty in some stage of their development in properly learning to dial or otherwise operate a telephone.

Problems also arise in operating the telephone for physically informed persons, such as those with visual infirmities or persons whose perception may be defective, as a result of a stroke or similar problem. With a vision impairment a person may not be able to read or recognize the numerals appearing in a telephone book or may not recognize the numerals appearing on the telephone itself. In other cases, a person may have clear vision, but for some reason the perception of the numerals does not register.

Students with learning disabilities, such as those who may have a normal I.Q. but may be slow in mathematics or reading, may also encounter trouble in learning the proper operation of the telephone.

It is very desirable that persons who are mentally retarded or physically informed, or small children, be able to dial certain telephone numbers for emergency purposes, such as the telephone numbers of the family, police, fire department, doctors, or the like.

SUMMARY OF THE INVENTION

The present invention is directed to a device for instructing in the operation of a telephone and is particularly useful for enabling the mentally retarded, as well as the physically infirmed to dial or call a given telephone number.

More specifically, the ten operating elements on the telephone, either the finger holes in the dialing ring of a dial telephone, or the push-buttons in a push button telephone, which normally bear the digits 0–9, are provided with different visual markings or indicia, such as different colors, or different figures, so that each marking corresponds to or represents one of the ten numerals or digits.

The visual markings corresponding to a specific telephone number to be dialed are applied in sequence to a card, and the markings on the card are individually viewed through a window in a card holder. As each marking is viewed through the window, the student will actuate the corresponding marking on the telephone to thereby place the call.

The present invention enables persons who are mentally retarded, as well as persons who may have defective eyesight or perception, as well as small children, to dial or operate the telephone. The color coding in particular is more easily distinguishable by the mentally retarded and by persons with defective eyesight than numerals, and while it has been found that a given person may have extreme difficulty in distinguishing and matching numerals, he frequently can readily match and distinguish colors.

In the case of the mentally retarded, after the student has developed the skill to dial or operate the telephone through use of the color code, the colors can then be combined with the numerals, and subsequently in the advanced stage, the colors can be eliminated. With this procedure the person is advanced from the color coding stage, to the combined color and numeral stage to the numeral stage.

As an aid to the student, and particularly the mentally retarded or smaller children, a photograph or sketch can appear on each card indicating the nature or character of the telephone number applied thereto. For example, a picture of a family relative can be attached to the card indicating that the telephone number is that of the relative, or a picture of a policeman can be utilized, indicating that the telephone number represents that of the police department.

While the device is particularly useful in teaching students the operation of the telephone, it is also useful in teaching colors and numerals to mentally retarded students, as well as smaller children.

Other objects and advantages will appear in the course of the following description.

The drawings illustrate the best mode presently contemplated of carrying out the invention.

In the drawings:

FIG. 1 is a top view of a conventional dial telephone incorporating the overlay ring of the invention;

FIG. 2 is a plan view of the strip which bears a specific telephone number;

FIG. 3 is a plan view of the strip assembled with the card holder;

FIG. 4 is a view of a modified form of the card and card holder; and

FIG. 5 is a plan view of a push-button type of telephone utilizing the invention.

DESCRIPTION OF THE PREFERRED EMBODIMENT

FIG. 1 shows a conventional dial telephone 1 which includes a body 2 and a receiver 3 is normally supported on a pivotable support or hook 4. Mounted on the face of the body 2 is a rotatable dial ring 5 having ten finger holes 6 which correspond to the numerals 1–9 and 0. An L-shaped hook 7 extends outwardly from the body 2 over the dialing ring and provides a stop for the dialing rotation.

According to the invention, an overlay ring 8 is applied to the face of the body 2 and surrounds the dialing ring 5. The overlay ring 8 is provided with ten different visual markings or indicia 9 and the markings 9 are all visually distinct from each other. For example, as shown in FIG. 1, the markings may take the form of ten different colored spots, with each colored spot corresponding to one of the finger holes 6 and thus corresponding to one of the ten numerals.

It may also be desirable in certain stages of the teaching to apply the numerals 0–9 to the color spots or markings 9, although this is not essential.

The particular type of visual markings to be utilized is not critical to the invention, and while colored spots are easily recognizable by most people, it is contemplated that other types of markings or indicia can be utilized. For example, the markings 9 may take the form of different shaped or contoured figures, such as a triangle, rectangle, oval, etc., or the markings may take the form of pictures of different animals, etc. Thus, the particular type of visual marking 9 is not critical to the invention, but each of the markings 9 should be visually distinct from the other markings.

To prevent rotation of the overlay ring 9 with respect to the telephone body 2, the ring can be provided with a notch 10 which engages the arm 7.

In order to dial a specific telephone number, a series of the markings 9 corresponding to the numerals of the telephone number are applied in sequence to a card or strip 11. As shown in FIG. 2, the card is provided with a series of seven markings 9 which correspond to the seven digits or numerals of the telephone number to be dialed. In the event a long distance telephone number is to be dialed, the additional markings corresponding to the digit 1 and the area code can also be applied to the card 11.

It may also be desirable when using the device with small children or mentally retarded persons to apply the name of the person or party associated with the telephone number, as indicated by 12, to the card 11 and also a picture, sketch or drawing of the party, as indicated generally by 13. For example, if the telephone number on the card 11 is that of the police department, a sketch or drawing of a policemen can be utilized as the picture 13. Similarly, if the telephone number is that of a relative, such as a grandmother, a picture of the grandmother can be applied to the card. Similar drawings or sketches can be utilized for other numbers that are often dialed, such as the fire department, doctor, operator, weather, time, etc.

The card 11 is adapted to be contained within a card holder 14 which is provided with a window 15 of sufficient size so that only one of the markings 9 can be exposed at one time.

To dial the telephone number, the student will pull the card 11 to the left, as shown in FIG. 2, which will thereby expose the first marking 9 within the window 15. With the marking 9 exposed, the student will insert his finger in the finger hole 6 having the corresponding marking 9 and will dial that number. For instance, if the first exposed marking 9 is a green spot, the student will then dial the digit having a corresponding green spot on the overlay ring. The student will then pull the card further to the left exposing the next marking 9 and will similarly dial the digit or numeral on the telephone corresponding to that marking. With this procedure the student can readily dial the entire telephone number and make the call.

As noted with respect to the markings 9 on the overlay ring, the markings applied to the card 11 can also bear the corresponding numerals or digits if desired.

When dealing with mentally retarded persons, or small children, the initial stage of instruction may be merely to apply colored markings 9 to both the overlay ring 8 and the card 11 and have the student dial the number merely by matching the colors. While many persons may have difficulty in distinguishing and correlating numbers, it has been found that frequently the same person can readily distinguish and match colors. As a student progresses, numerals can be used in conjunction with the markings on the card 11 and overlay ring 8.

FIG. 4 illustrates a modified form of the card and card holder which bears the telephone number to be dialed. In this embodiment, a sheet or card 16 carries a series of markings 9 which correspond to the telephone number to be dialed. A separate viewer 17 is utilized to individually view each of the markings on the sheet 16. As shown in FIG. 4, the viewer is provided with a window 18 having a size such that only one of the markings 9 on the sheet 16 will be exposed at one time. The student by grasping the tab 19 on viewer 17 can move the viewer over the sheet to successively expose each of the markings 9 and dial the corresponding digits, as previously described.

While the above description has shown the use of the invention with dial telephones, the invention can also be utilized with a push-button telephone as illustrated in FIG. 5. In this embodiment the telephone 20 is a conventional push button type having ten buttons 21 which can be depressed to make the connection or call. The visual markings 22, such as the markings 9, can be applied or associated with each of the buttons 21. As previously noted, the visual markings 22 can be separate or different colors, figures, animals, etc., and as shown in FIG. 5, the markings take the form of colored tabs which are applied to the upper surfaces of the buttons 21 by a pressure sensitive adhesive or the like. Alternately, the markings 22 can be in the form of rings which surround each button 21, or if colored markings are utilized the buttons themselves can be molded in the various colors.

In operation, the device will be used with the push-button telephone in the same manner as described with respect to the dial phone in which the student will successively expose each of the markings on the card 11 and will then push the button 21 bearing the corresponding marking to complete or connect the call.

While the drawings have shown the markings representing the telephone number to be dialed as being successively viewed through a window in a viewer, the use of a viewer is not essential, depending on the capability of the student, and the markings 9 may merely be prominently displayed on the card or sheet and dialed directly from the sheet without using the viewer.

In the embodiment shown in FIGS. 1-3, the markings 9 are illustrated as being applied to the overlay ring 8. However, the overlay ring need not be utilized and the markings can be applied directly to the body 2 of the telephone, as for example, in alignment beneath the respective finger holes 6.

Various modes of carrying out the invention are contemplated as being within the scope of the following claims particularly pointing out and distinctly claiming the subject matter which is regarded as the invention.

I claim:

1. A teaching device for teaching an individual to operate a telephone, said telephone having ten operating elements and having the numerals 0-9 inclusive associated respectively with each of said operating elements, said device including a visual marking associated with each operating element, each marking being visually distinct from said numerals, each marking being visually distinct from all of the other markings whereby each marking corresponds to one of said numerals, a member separate from said telephone and bearing a series of said markings in a sequence corresponding to a telephone number to be dialed, viewing means for manually isolating each marking on said member, whereby each marking can be separately viewed and the individual can actuate the operating element bearing the marking corresponding to the isolated marking on said member, and indicia on said member indicating the party represented by the telephone number.

2. The device of claim 1, wherein the telephone is a dial type and the operating elements are finger holes in a dialing ring.

3. The device of claim 1, wherein the telephone is a push button type and the operating elements are depressible buttons, said markings are applied to the outer surface of the push buttons.

4. The device of claim 1, wherein the member is a card and said viewing means is a card holder having a window of sufficient size to expose only one of the markings on the card at one time.

5. The device of claim 4, wherein said card holder is a hollow member and the card is disposed to slide within said holder.

6. The device of claim 1, wherein said telephone is a dial telephone and includes a dialing ring, said operating elements comprising a series of finger holes in said dialing ring, an overlay ring applied to the telephone and disposed radially outward of said dialing ring, said markings associated with the operating elements being colored spots on said overlay ring with each marking being disposed radially outward of a finger hole and the markings on said member being colored spots.

7. The device of claim 1, wherein said indicia is a pictorial representation.

8. The device of claim 1, wherein said markings comprise colored spots.

* * * * *